United States Patent
Woolley et al.

(10) Patent No.: US 11,397,574 B2
(45) Date of Patent: Jul. 26, 2022

(54) CHANGES IN SOURCE CODE

(71) Applicant: INTERNATIONAL BUSINESS MACHINES CORPORATION, Armonk, NY (US)

(72) Inventors: Mark Andrew Woolley, Winchester (GB); Mark John Pocock, Southampton (GB); Andrew Wright, Chandlers Ford (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/937,095

(22) Filed: Jul. 23, 2020

(65) Prior Publication Data
US 2022/0027148 A1    Jan. 27, 2022

(51) Int. Cl.
*G06F 8/71*    (2018.01)
*G06F 11/36*    (2006.01)

(52) U.S. Cl.
CPC ............ *G06F 8/71* (2013.01); *G06F 11/3636* (2013.01)

(58) Field of Classification Search
CPC .............................. G06F 8/71; G06F 11/3636
See application file for complete search history.

(56) References Cited

U.S. PATENT DOCUMENTS

| | | | | |
|---|---|---|---|---|
| 7,251,655 B2* | 7/2007 | Kaier | ........................ | G06F 8/71 707/999.009 |
| 7,506,330 B2* | 3/2009 | Alexander, III | .... | G06F 11/3447 717/157 |
| 8,683,438 B2* | 3/2014 | Orrick | ................... | G06F 11/362 717/124 |
| 9,032,371 B2* | 5/2015 | Hansson | ............. | G06F 11/3692 717/124 |
| 9,747,190 B2* | 8/2017 | Tojo | ..................... | G06F 11/3636 |
| 2005/0033553 A1* | 2/2005 | Swaine | ............... | G06F 11/3476 714/E11.2 |
| 2005/0289400 A1* | 12/2005 | Kimura | ............... | G06F 11/3636 714/45 |
| 2008/0022843 A1* | 1/2008 | Drukman | ............ | G06F 11/3636 84/609 |
| 2008/0059977 A1* | 3/2008 | Brown | ....................... | G06F 8/71 719/316 |
| 2008/0270995 A1* | 10/2008 | Dimpsey | ................. | G06F 11/36 717/128 |
| 2009/0064117 A1* | 3/2009 | Bashkansky | ............ | G06F 8/443 717/154 |
| 2010/0218031 A1 | 8/2010 | Agarwal et al. | | |
| 2010/0299654 A1* | 11/2010 | Vaswani | ............... | G06F 11/366 717/128 |
| 2012/0017123 A1* | 1/2012 | Masser | ............... | G06F 11/3466 714/45 |
| 2012/0137273 A1* | 5/2012 | Meijler | ............... | G06F 11/3476 717/128 |

(Continued)

*Primary Examiner* — Douglas M Slachta
(74) *Attorney, Agent, or Firm* — Jordan T. Schiller (57) ABSTRACT

Embodiments for describing an impact of a change in source code on a trace are presented. One embodiment comprises determining whether or not a change in source code between a first version and a second version of the source code affects a trace output of the source code. Responsive to determining that the change in the source code affects the trace output, metadata descriptive of the change in the source code is generated.

18 Claims, 7 Drawing Sheets

(56) References Cited

U.S. PATENT DOCUMENTS

| | | | |
|---|---|---|---|
| 2012/0233600 A1* | 9/2012 | Uno | G06F 11/3636 |
| | | | 717/128 |
| 2013/0047140 A1* | 2/2013 | Shann | G06F 11/3612 |
| | | | 717/128 |
| 2013/0179867 A1* | 7/2013 | Fitterer | G06F 8/71 |
| | | | 717/130 |
| 2014/0053025 A1 | 2/2014 | Marvasti et al. | |
| 2015/0026666 A1* | 1/2015 | Tojo | G06F 11/3636 |
| | | | 717/128 |
| 2015/0254124 A1 | 9/2015 | Berg et al. | |
| 2016/0034270 A1 | 2/2016 | Swierc et al. | |
| 2016/0246703 A1* | 8/2016 | Bank | G06F 8/71 |
| 2017/0160995 A1* | 6/2017 | Fukasawa | G06F 8/61 |
| 2018/0157581 A1* | 6/2018 | Beard | G06F 11/00 |
| 2018/0196657 A1* | 7/2018 | Kou | G06F 11/3604 |
| 2019/0138428 A1* | 5/2019 | Sumitomo | G06F 9/44536 |

\* cited by examiner

CHANGES IN SOURCE CODE

BACKGROUND

The present invention relates generally to software source code, and more particularly to describing an impact of a change in source code.

It is common for traditional software to produce a trace when being executed in order to record what processing is taking place. Examples of information recorded in a trace include what code is being run, what values are being provided as input, and what values are being returned as output. In traditional software engineering, tracing involves a specialized use of logging to record information about a program's execution. This information is typically used by programmers for debugging purposes, and additionally, depending on the type and detail of information contained in a trace log, by experienced system administrators or technical-support personnel and by software monitoring tools to diagnose common problems with the software.

Traditional software tracing provides developers with information useful for debugging. This information is used both during development of software and after the release of the software. Software tracing may include different types of entries. Entries are typically classified in some way, for example as errors, warnings, information, or debug, which allows the user to configure the amount of detail and/or output produced by the trace.

In the event of a software error, a programmer and/or software engineer may review the trace in order to analyze and assess what happened in the build up to the error (e.g. to determine the cause of the error). After identifying an area of code with a problem, it is typical to check for recent changes to the area that may have introduced the problem, and for potential fixes.

A known approach to identifying changes when a problem occurs is to compare the trace from the time of the error with the trace captured previously when no problems had occurred. However, this approach does not highlight changes to the software, and relies on the end user to filter out the expected differences, such as differences in the data being processed and memory addresses.

SUMMARY

According to an aspect of the present invention, there is provided a computer-implemented method. The method comprises determining whether or not a change in source code between a first version and a second version of the source code affects a trace output of the source code. The method then comprises, responsive to determining that the change in the source code affects the trace output, generating metadata descriptive of the change in the source code.

According to yet another aspect of the invention, there is provided a system for describing an impact of a change in source code on a trace. The system comprises a trace analysis component configured to determine whether or not a change in source code between a first version and a second version of the source code affects a trace output of the source code. The system further comprises, a metadata component configured to, responsive to determining that the change in the source code affects the trace output, generate metadata descriptive of the change in the source code.

According to another aspect of the invention, there is provided a computer program product for describing an impact of a change in source code on a trace. The computer program product comprises a computer readable storage medium having program instructions embodied therewith, the program instructions executable by a processing unit to cause the processing unit to perform a method according to a proposed embodiment.

BRIEF DESCRIPTION OF THE DRAWINGS

Preferred embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Embodiments for describing an impact of a change in source code on a trace is proposed. Included is enabling automatic analysis through the production of metadata about each change to software source code. Further, such embodiments may assist analysis by identifying or highlighting changes that may be of interest. For instance, if problems occur, trace entries in changed areas may be emphasized. Accordingly, embodiments may facilitate a reduction in the amount time needed for debugging source code, for example by highlighting a change at a location in the source code where an error occurred (or in the events leading up to a change or error).

Embodiments may involve the creation of data about trace changes using static analysis techniques to support software debugging. Metadata corresponding to the trace changes may be proactively produced to assist a user (i.e. a software engineer/developer) with problem determination. Consequently, embodiments may generate metadata about changes to source code in response to the changes occurring. The generated metadata may then, for example, be used when displaying the software trace output in order to draw attention to changes.

A software trace output may include an audit trail (i.e. a chronological record) produced by the software that may be analyzed if a software error occurs. The trace output may refer to the record or logging of changes that have been made to the software.

Embodiments may be implemented in conjunction with software as a service (SaaS) and/or an on-premise software. SaaS is a software distribution model in which third-party provider hosts applications and makes them available to customers over the Internet. On-premise software is installed and runs on computer on the premise of the user or organization using the software, rather than at a remote facility such as a sever farm or cloud. In both cases, changes may be deployed incrementally and there may be changes that are yet to be deployed.

Embodiments may further be implemented in conjunction with analyzing each change to source code of a software product. Responsive to determining that the change may impact a trace output (i.e. a trace) of the software product, metadata may be created that describes the change. The metadata may be proactively inputted into trace or debugging software at the time the code is created. The metadata is therefore available to be used by a software engineer/developer to review the trace output in response to a problem (i.e. software error) occurring. For example, when reviewing the trace output in a web browser based application, the trace output and the associated metadata are displayed together. Trace entries in the trace output with recent changes or changes that have not yet been deployed may be highlighted to the software engineer/developer. Additionally, embodiments may facilitate the concept of analyzing changes in the source code, such that the software trace output (i.e. the software log) may be annotated with the changes that may have impacted the trace entries in response to a software error occurring.

Embodiments may further be implemented in conjunction with analyzing each change to source code of a software product, wherein when a change is made (i.e. committed) to the source code, the change may be automatically analyzed using static analysis techniques to determine whether any changes to the trace output may occur as a result of the change. Additionally, embodiments may facilitate the concept of creating a record (i.e. metadata) which may include the change, the type of change, and a measure of the significance of the change and transferring to the software engineer/developer.

Embodiments may create metadata about potential changes to the software trace output and correlate the created metadata with the state of a running instance of the software. As a result, the time taken to resolve a problem (i.e. a software error) may be reduced, such that software support costs may also be reduced. Software engineers/developers may no longer need to search for recent changes in the software or potential solutions to the problem.

Accordingly, using static analysis techniques to understand how changes in source code of a software can impact a corresponding software trace output produced when the software is run. Metadata about the changes can be generated and displayed to a user in conjunction with displaying the trace output. Software used to view the trace output can leverage the generated metadata as an input, e.g. to identify trace entries within the trace output that have been impacted by recent change to the source code.

In a proposed embodiment, determining whether or not a change in source code between a first version and a second version of the source code affects a trace output of the source code comprises determining whether or not a change in a source code between a first version and a second version of the source code generates a trace change in a trace output of the source code. In this way, a change in the source code between the first version and the second version of the source code that may generate a trace change in the trace output can be identified and distinguished from a change in the source code that may not generate a trace change in the trace output. Consequently, this can enable metadata descriptive of the change to be generated only if the change in the source code generates a trace change in the trace output, instead of for all changes in the source code. As such, the efficiency and efficacy in generating the metadata may be improved.

In some embodiments, the method may further comprise associating the metadata with the generated trace change in the trace output. In this way, the generated metadata may be linked to the generated trace change in the trace output. This may enable the trace change to be highlighted in the trace output using the generated metadata, such that the user's attention may be drawn to the trace change. Further information provided by the generated metadata can be presented to the user in regard to the trace change, which may provide the user with an improved overview of the trace change. As a result, this can reduce the time required for debugging the software, which improves the overall efficiency of the debugging process.

In an embodiment, the trace change in the trace output comprises at least one of a change in a trace entry of the trace output, a change in a property of a function that issues a trace entry of the trace output, and a change in a property of a set of code that issues a trace entry of the trace output. In this way, the scope of the variety of trace changes may be increased, which may improve the efficacy of determining whether or not a change in the source code between a first version and a second version of the source code affects the trace output of the source code. Consequently, this can increase the likelihood of correctly identifying a trace change in the trace output, which may improve the reliability when analyzing the change in the source code.

In some embodiments, a change in a trace entry of the trace output comprises at least one of issuing of a trace entry that was not previously issued, issuing a trace entry that was previously issued with different values, and not issuing a trace entry that was previously issued. In this way, the scope of the variety of changes in the trace entry of the trace output may be increased, which may improve the efficacy of determining whether or not a change in the source code between a first version and a second version of the source code affects the trace output of the source code. Consequently, this can increase the likelihood of correctly identifying a trace change in the trace output, which may improve the reliability when analyzing the change in the source code.

In some embodiments, the change in the property of the function that issues the trace entry may comprise a change in a rate of issue of the function. In this way, trace changes resulting from a change in the rate of issue of the functions that may issue the trace entry may be included within the scope of determining whether or not the change in source code affects the trace output of the source code. This may improve the efficacy in generating metadata responsive to determining that the change in the source code affects the trace output.

In some embodiments, the change in the property of the set of code that issues the trace entry comprises a change in running the set of code. In this way, trace changes resulting from a change in running the set of code may be included within the scope of determining whether or not the change in source code affects the trace output of the source code. This may improve the efficacy in generating metadata responsive to determining that the change in the source code affects the trace output.

In an embodiment, the metadata descriptive of the change in the source code may comprise at least one of an identifier of the change in the source code, an identifier of a deliverable associated with the change in the source code, a type of the change in the source code, and a measure of the significance of the change in the source code. In this way, the scope of the variety of generated metadata may be increased, which may provide more useful information to the user when highlighting the change in the trace output. Consequently, this may improve the reliability of providing information (i.e. metadata) in relation to the change in the source code, which may reduce the time required in debugging the software, as the information that may be useful and/or necessary for the user to debug the software may be provided to the user with improved efficiency.

In an embodiment, there is a method for code analysis and/or development. The method may comprise obtaining source code for analysis and/or development. The method may further comprise describing an impact of a change in the source code on a trace according to the approach discussed above and analyzing the trace output of the source code based on the metadata descriptive of the change in the source code. In this way, the efficiency of the analysis of the source code may be improved by generating metadata descriptive of the change in the source code in response to determining that the change affects the trace output. The generated metadata may be used to identify the associated change in the source code, which may enable the user to identify software errors with increased speed and efficiency during the analysis of the source code.

In an embodiment, there is a method for generating a control signal for a display. The method may comprise describing an impact of a change in source code on a trace according to the approach discussed above and generating a control signal for a display based on the metadata descriptive of the change in the source code. In this way, the generated metadata may be provided to the user by way of the generated control signal for the display. The generated metadata may be provided in combination with the software trace output, which may enable the user to identify the trace entries (i.e. trace changes) in the trace output corresponding to the generated metadata with improved efficiency and reliability.

Figure 1:
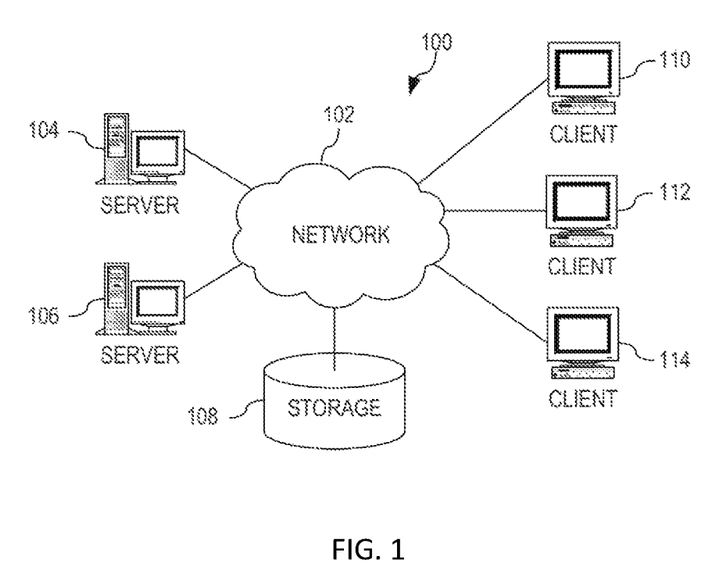
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
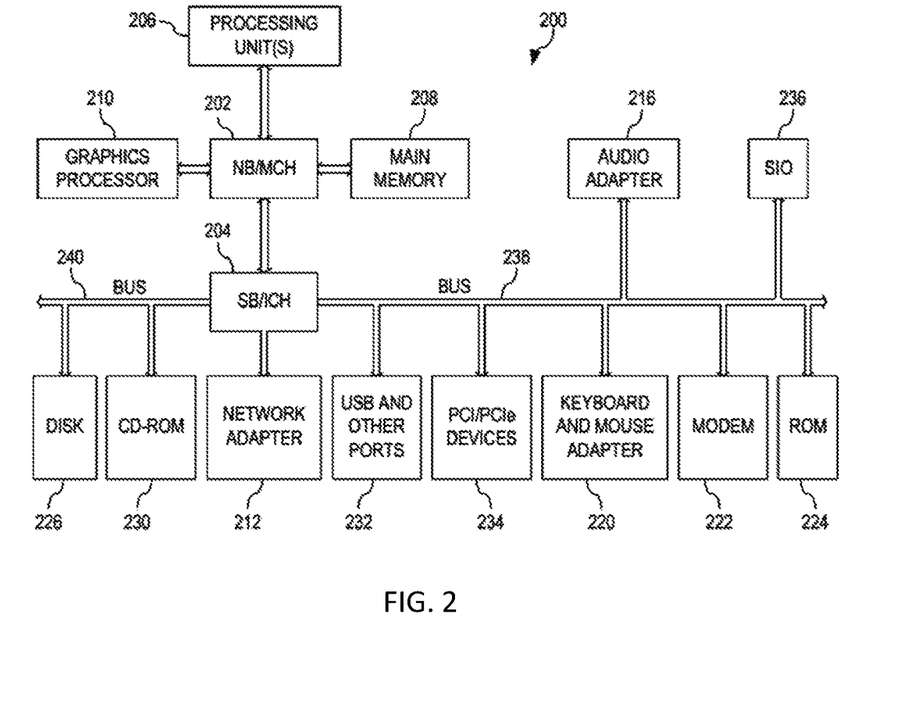
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement a trace analysis component, and a metadata component according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
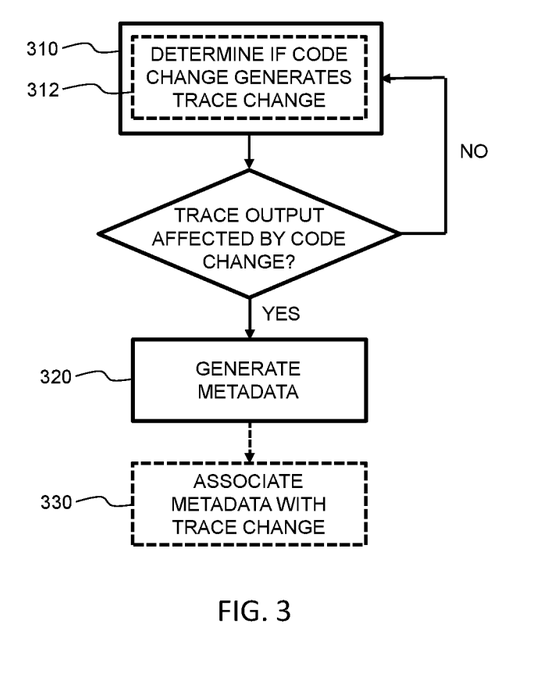
FIG. 3 is a flow diagram of a computer-implemented method for describing an impact of a change in source code on a trace.

Referring now to FIG. 3, there is depicted a flow diagram of a computer-implemented method for describing an impact of a change in source code on a trace.

Step 310 comprises determining whether or not a change in source code between a first version and a second version of the source code affects a trace output of the source code.

In an embodiment, step 310 comprises step 312 of determining whether or not a change in a source code between a first version and a second version of the source code generates a trace change in a trace output of the source code. Here, the trace change in the trace output comprises at least one of a change in a trace entry of the trace output, a change in a property of a function that issues a trace entry of the trace output, and a change in a property of a set of code that issues a trace entry of the trace output.

By way of example, a change in a trace entry of the trace output comprises at least one of issuing of a trace entry that was not previously issued, issuing a trace entry that was previously issued with different values, and not issuing a trace entry that was previously issued.

In an embodiment, the change in the property of the function that issues the trace entry comprises a change in a rate of issue of the function.

In an embodiment, the change in the property of the set of code that issues the trace entry comprises a change in running the set of code.

Responsive to determining that the change in the source code affects the trace output, the method proceeds to step 320 of generating metadata descriptive of the change in the source code.

After generating metadata in step 320, the method proceeds to step 330 of associating the metadata with the generated trace change in the trace output. Here, the metadata descriptive of the change in the source code comprises at least one of an identifier of the change in the source code, an identifier of a deliverable associated with the change in the source code, a type of the change in the source code, and a measure of the significance of the change in the source code.

In an example, a source code change is delivered to a software repository for a software product's source code. The change is automatically analyzed, for example by way of a webhook, using static analysis techniques to determine whether any changes to a corresponding trace output may occur (i.e. trace changes). Examples of trace changes include, but are not limited to, a trace entry being issued where a trace entry was not issued previously, a trace entry no longer being issued where one was previously issued, and a trace entry being issued with different values. For example, the trace entry contains a new constant, the code that manipulates a data item that is traced has been changed, and/or the format of the data items have changed (e.g. an integer type replaced by a double type). Further examples of trace changes include a function that may issue a trace entry being issued more or less frequently (e.g. an additional call to this function is added) and/or a trace entry being issued by code that now runs in parallel to other code, where previously this was not possible.

Based on the analysis of the change, one or more records are created. For example, the record(s) includes an identifier of the change in source code (e.g. the git commit), an identifier of the deliverable that will be deployed (e.g. a version/release number), a type of change, and a significance of the change (e.g. a value from 0 to 1). As an example, an additional call to a function that issues a trace entry is more significant than a conditional call to this function.

The record(s) are concatenated such that changes in the software product's source code have a corresponding stream of trace change data.

Figure 4:
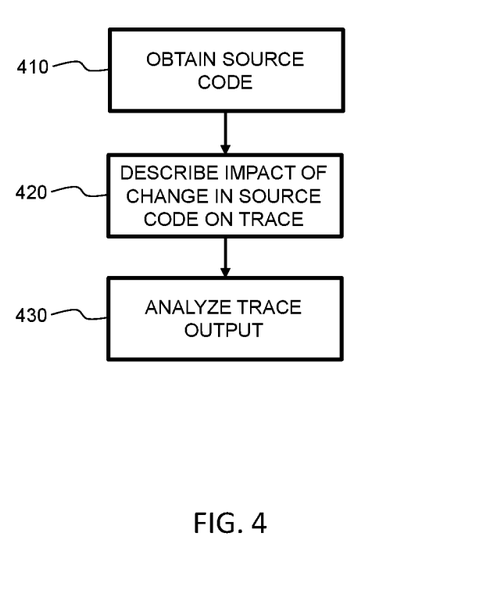
FIG. 4 is a flow diagram of a computer-implemented method for code analysis and/or development.

Referring now to FIG. 4, there is depicted a flow diagram of a computer-implemented method for code analysis and/or development.

Step 410 comprises obtaining source code for analysis and/or development. Step 420 comprises describing an impact of a change in the source code on a trace, in accordance with the computer-implemented method depicted in FIG. 3. Step 430 comprises analyzing the trace output of the source code based on the metadata descriptive of the change in the source code.

In an example, the trace change data is provided as an input or able to be queried by software used to view the trace output. The software used to view the trace output retrieves information about the level (i.e. the created record(s)) from the trace output that is deployed to identify which trace changes are deployed and which are not deployed. When a software engineer/developer views the trace output, any entries subject to recent changes are highlighted (i.e. emphasized). In an example, the changes are highlighted differently based on the significance of the change, the type of change, the number of changes to have impacted a trace entry, when the change was made to the source, and/or when it was deployed to production. Trace entries where a change may occur if additional maintenance was deployed may also be emphasized.

By way of example, the following pseudo-code may be received:

```
function transferMoney(from, to, amount) {
    traceEntry(from, to, amount);
    updateBalance(from, -amount);
    updateBalance(to, amount);
    traceExit( );
}
function updateBalance(person, amount) {
    traceEntry(person, amount, balances[person]);
    balances[person] += amount;
    traceExit(person, balances[person]);
}
```

In the example above, the second call to updateBalance in transferMoney has been added to fix a bug (i.e. an error). Responsive to the change being made, the following data about the change is produced:

```
commit: #123456
version: 1.01
trace changes: {
more updateBalance traceEntry entries between transferMoney traceEntry and traceExit
more updateBalance traceExit entries between transferMoney traceEntry and traceExit
}
```

Trace viewer software (i.e. software used to view the trace output) then uses the data described above to highlight the affected trace entries to draw attention to the update, as indicated by the "+" symbol in the following:
[getBalance] [entry] [Mark]
[getBalance] [exit] [Mark, 100]
[transferMoney] [entry] [Mark, Andy, 10]
+[updateBalance] [entry] [Mark, -10, 100]
+[updateBalance] [exit] [Mark, 90]
+[updateBalance] [entry] [Andy, 10, 100]
+[updateBalance] [exit] [Andy, 110]
[transferMoney] [exit] H
[cashWithdrawal] [entry] [Andy, 10]
[updateBalance] [entry] [Andy, -10, 110]
[updateBalance] [exit] [Andy, 100]
[cashWithdrawal] [exit] H
[getBalance] [entry] [Andy]
[getBalance] [exit] [Andy, 100]

In the example, other calls to updateBalance are not highlighted. If a subsequent problem occurs in this area, the software engineer/developer diagnosing the problem may immediately be aware of the recent fix and may investigate whether there is a relationship between the fix and the problem.

Figure 5:
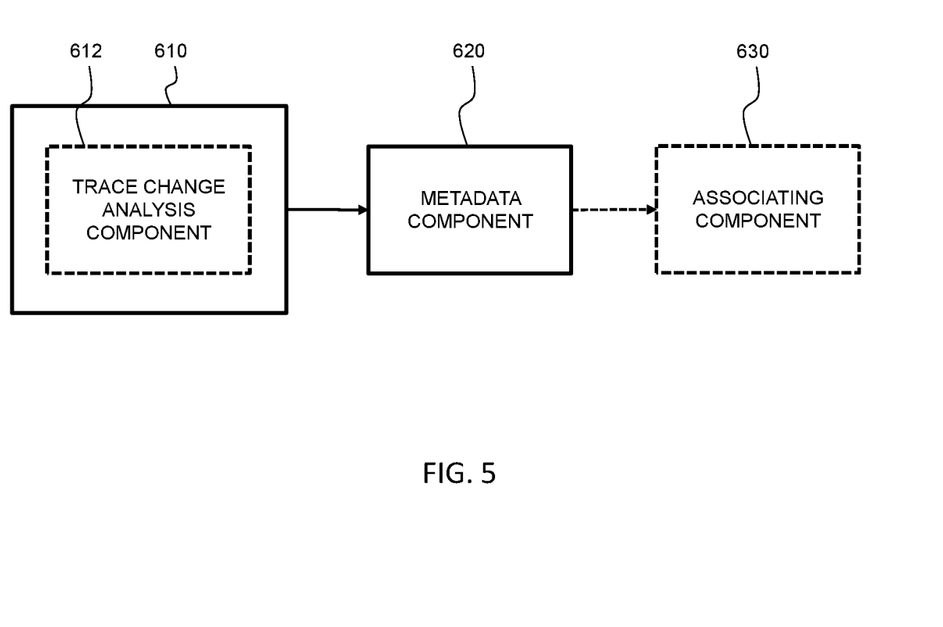
FIG. 5 is a simplified block diagram of an exemplary embodiment of a system for describing an impact of a change in source code on a trace.

Referring now to FIG. 5, there is depicted a simplified block diagram of an exemplary embodiment of a system for describing an impact of a change in source code on a trace.

The system comprises a trace analysis component 610 configured to determine whether or not a change in source code between a first version and a second version of the source code affects a trace output of the source code. The system further comprises a metadata component 620 configured to, responsive to the trace analysis component determining that the change in the source code affects the trace output, generate metadata descriptive of the change in the source code.

In an embodiment, the trace analysis component 610 comprises a trace change analysis component 612 configured to determine whether or not a change in a source code between a first version and a second version of the source code generates a trace change in a trace output of the source code.

In an embodiment, the system further comprises an associating component 630 configured to associate the metadata with the generated trace change in the trace output.

In an embodiment, the trace change in the trace output comprises at least one of a change in a trace entry of the trace output, a change in a property of a function that issues a trace entry of the trace output, and a change in a property of a set of code that issues a trace entry of the trace output.

In an embodiment, a change in a trace entry of the trace output comprises at least one of issuing of a trace entry that was not previously issued, issuing a trace entry that was previously issued with different values, and not issuing a trace entry that was previously issued.

In an embodiment, the change in the property of the function that issues the trace entry comprises a change in a rate of issue of the function.

In an embodiment, the change in the property of the set of code that issues the trace entry comprises a change in running the set of code.

In an embodiment, the metadata descriptive of the change in the source code comprises at least one of an identifier of the change in the source code, an identifier of a deliverable associated with the change in the source code, a type of the change in the source code, and a measure of the significance of the change in the source code.

Figure 6:
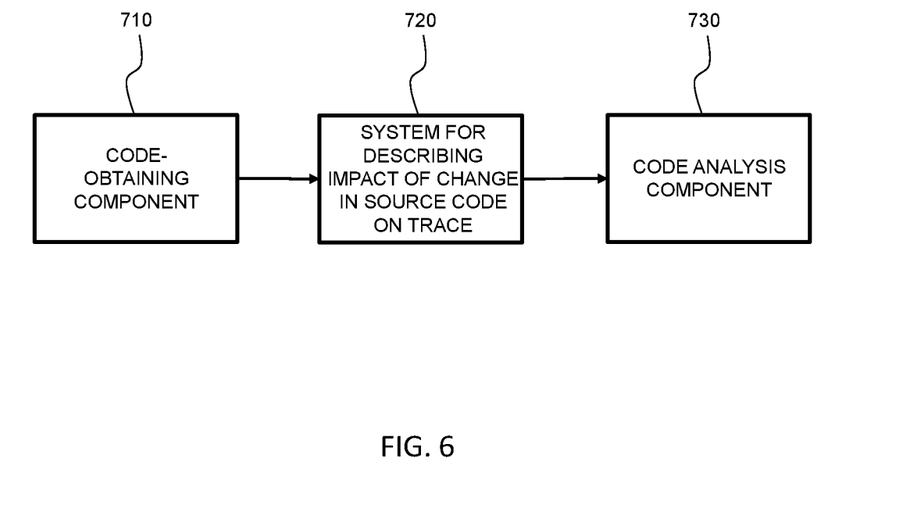
FIG. 6 is a simplified block diagram of an exemplary embodiment of a system for code analysis and/or development.

Referring now to FIG. 6, there is depicted a simplified block diagram of an exemplary embodiment of a system for code analysis and/or development.

The system comprises a code-obtaining component 710 configured to obtain source code for analysis and/or development. The system further comprises a system 720 for describing an impact of a change in the source code on a trace, in accordance with the system depicted in FIG. 5. The system further comprises a code analysis component 730 configured to analyze the trace output of the source code based on the metadata descriptive of the change in the source code.

Figure 7:
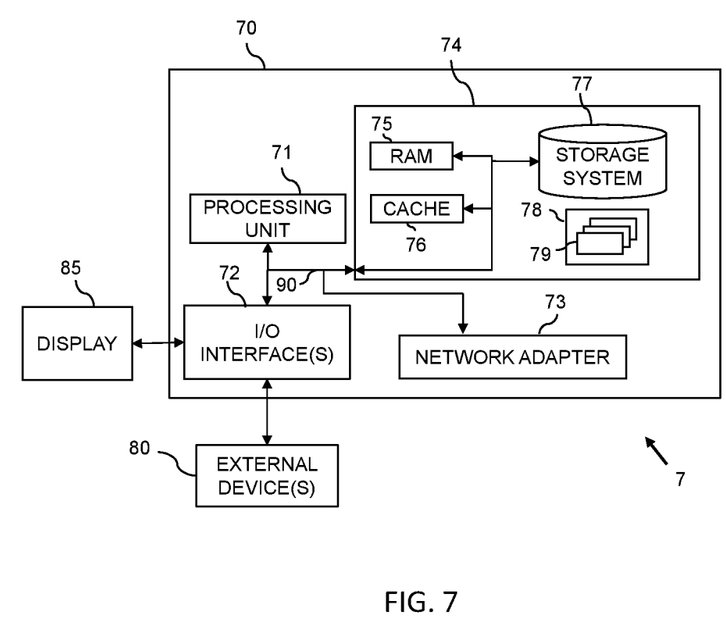
FIG. 7 is a block diagram of an example system in which aspects of the illustrative embodiments may be implemented.

By way of further example, as illustrated in FIG. 7, embodiments may comprise a computer system 70, which may form part of a networked system 7. For instance, a trace analysis component may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method for describing an impact of a change in source code on a trace.

Program/utility 78, having a set (at least one) of program modules 79, may be stored in memory 74. Program modules 79 generally carry out the functions and/or methodologies of proposed embodiments for describing an impact of a change in source code on a trace.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    based on a result of static analysis of source code, determining that a change in the source code affects a corresponding trace output of the source code at runtime;
    generating a metadata record descriptive of the change in the source code, wherein the metadata record includes an indication of a significance of the change in the source code;
    analyzing the trace output of the source code based on the metadata record descriptive of the change in the source code;
    concatenating the metadata records in an order corresponding to the changes in the source code, wherein the changes in the source code have a corresponding stream of trace change data;
    generating a control signal for a display based on the metadata record descriptive of the change in the source code; and
    displaying the corresponding metadata records in conjunction with displaying the trace output, by way of the generated control signal for the display.

2. The method of claim 1, wherein the trace change in the trace output comprises at least one of:
    a change in a trace entry of the trace output;
    a change in a property of a function that issues a trace entry of the trace output; and
    a change in a property of a set of code that issues a trace entry of the trace output.

3. The method of claim 2, wherein a change in a trace entry of the trace output comprises at least one of:
    issuing of a trace entry that was not previously issued;
    issuing a trace entry that was previously issued with different values; and
    not issuing a trace entry that was previously issued.

4. The method of claim 2, wherein the change in the property of the function that issues the trace entry comprises a change in a rate of issue of the function.

5. The method of claim 2, wherein the change in the property of the set of code that issues the trace entry comprises a change in running the set of code.

6. The method of claim 1, wherein the metadata descriptive of the change in the source code comprises at least one of:
    an identifier of the change in the source code;
    an identifier of a deliverable associated with the change in the source code;
    a type of the change in the source code; and
    a measure of the significance of the change in the source code.

7. The method of claim 1, wherein the trace output at a location of a software error is annotated with changes to the source code.

8. The method of claim 1, wherein trace entries in the trace output associated with changes that have not yet been deployed are highlighted.

9. A computer program product, wherein the computer program product comprises a computer readable storage medium having program instructions embodied therewith, the program instruction executable by a processing to cause the processing unit to perform the method comprising:
    based on a result of static analysis of source code, determining that a change in the source code affects a corresponding trace output of the source code at runtime;
    generating a metadata record descriptive of the change in the source code, wherein the metadata record includes an indication of a significance of the change in the source code;
    analyzing the trace output of the source code based on the metadata record descriptive of the change in the source code;
    concatenating the metadata records in an order corresponding to the changes in the source code, wherein the changes in the source code have a corresponding stream of trace change data;
    generating a control signal for a display based on the metadata record descriptive of the change in the source code; and
    displaying the corresponding metadata records in conjunction with displaying the trace output, by way of the generated control signal for the display.

10. The computer program product of claim 9, further comprising:
inputting the generated metadata into a software tool used to review trace output in advance of a software problem occurring.

11. A system comprising: one or more processors; and a computer-readable memory coupled to the one or more processors, the computer-readable memory comprising instructions for:
based on a result of static analysis of source code, determining that a change in the source code affects a corresponding trace output of the source code at runtime;
generating a metadata record descriptive of the change in the source code, wherein the metadata record includes an indication of a significance of the change in the source code;
analyzing the trace output of the source code based on the metadata record descriptive of the change in the source code;
concatenating the metadata records in an order corresponding to the changes in the source code, wherein the changes in the source code have a corresponding stream of trace change data;
generating a control signal for a display based on the metadata record descriptive of the change in the source code; and
displaying the corresponding metadata records in conjunction with displaying the trace output, by way of the generated control signal for the display.

12. The system of claim 11, further comprising performing trace analysis comprising determining whether or not a change in a source code between a first version and a second version of the source code generates a trace change in a trace output of the source code.

13. The system of claim 12, further comprising associating the metadata with the generated trace change in the trace output.

14. The system of claim 12, wherein the trace change in the trace output comprises at least one of:
a change in a trace entry of the trace output;
a change in a property of a function that issues a trace entry of the trace output; and
a change in a property of a set of code that issues a trace entry of the trace output.

15. The system of claim 14, wherein a change in a trace entry of the trace output comprises at least one of:
issuing of a trace entry that was not previously issued;
issuing a trace entry that was previously issued with different values; and
not issuing a trace entry that was previously issued.

16. The system of claim 14, wherein the change in the property of the function that issues the trace entry comprises a change in a rate of issue of the function.

17. The system of claim 14, wherein the change in the property of the set of code that issues the trace entry comprises a change in running the set of code.

18. The system of claim 11, wherein the metadata descriptive of the change in the source code comprises at least one of:
an identifier of the change in the source code;
an identifier of a deliverable associated with the change in the source code;
a type of the change in the source code; and
a measure of the significance of the change in the source code.

* * * * *